(12) United States Patent
McDonough

(10) Patent No.: US 6,463,695 B2
(45) Date of Patent: Oct. 15, 2002

(54) LIQUID BAIT STATION

(76) Inventor: John P. McDonough, 6558 Pineloch Ct., Jupiter, FL (US) 33458

( * ) Notice: Subject to any disclaimer, the term of this patent is extended or adjusted under 35 U.S.C. 154(b) by 0 days.

(21) Appl. No.: 09/814,979

(22) Filed: Mar. 22, 2001

(65) Prior Publication Data

US 2002/0134002 A1 Sep. 26, 2002

(51) Int. Cl.⁷ ................................................ A01M 1/20
(52) U.S. Cl. ........................................ 43/131; 43/132.1
(58) Field of Search ................. 43/131, 107, 124, 43/132.1; 604/295; 222/420, 206

(56) References Cited

U.S. PATENT DOCUMENTS

| | | | | |
|---|---|---|---|---|
| 229,222 A | * | 6/1880 | Wood | 43/131 |
| 243,816 A | * | 7/1881 | Townsend | 43/131 |
| 251,222 A | * | 12/1881 | Hamilton | 43/131 |
| 2,004,123 A | * | 6/1935 | Loibl, Jr. | 43/131 |
| 2,045,018 A | * | 6/1936 | Loibl, Jr. | 43/131 |
| 2,180,199 A | * | 11/1939 | Loibl, Jr. | 43/131 |
| 2,234,500 A | * | 3/1941 | Moore | 43/131 |
| 2,451,578 A | * | 10/1948 | Rosefield | 43/131 |
| 2,632,280 A | * | 3/1953 | Heim | 43/131 |
| 2,635,382 A | * | 4/1953 | Kuntz | 43/131 |
| 2,781,607 A | * | 2/1957 | Smiley | 43/131 |
| 2,906,056 A | * | 9/1959 | Youngblood | 43/124 |
| 3,017,717 A | * | 1/1962 | Caubre | 43/131 |
| 3,517,454 A | * | 6/1970 | Query | 43/131 |
| 3,619,934 A | * | 11/1971 | Tunstall et al. | 43/131 |
| 4,173,226 A | * | 11/1979 | Shell | 604/295 |
| 4,212,204 A | * | 7/1980 | St. Amand | 222/420 |
| 4,563,104 A | * | 1/1986 | Saint-Amand | 222/420 |
| 4,662,103 A | * | 5/1987 | Cheng | 43/131 |
| 4,779,768 A | * | 10/1988 | St. Amand | 222/420 |
| 4,917,274 A | * | 4/1990 | Asa et al. | 222/420 |
| 4,968,310 A | * | 11/1990 | Menchel et al. | 604/295 |
| 5,152,096 A | * | 10/1992 | Rudolph | 43/124 |
| 5,325,626 A | * | 7/1994 | Jackson | 43/132.1 |
| 5,490,938 A | * | 2/1996 | Sawan et al. | 222/420 |
| 5,875,586 A | * | 3/1999 | Ballard et al. | 43/131 |

FOREIGN PATENT DOCUMENTS

| | | | | |
|---|---|---|---|---|
| FR | 1199857 B1 | * | 1/1959 | 43/131 |
| JP | 9-205961 B1 | * | 8/1997 | |
| NL | 8005387 B1 | * | 4/1981 | 43/131 |

* cited by examiner

*Primary Examiner*—Darren W. Ark
(74) *Attorney, Agent, or Firm*—Norman Friedland

(57) ABSTRACT

A disposable liquid bait station is configured in the form of a syphon with a bulbous end portion and a stem portion having a passage extending from the end of the stem into the bulbous end portion for syphoning liquid bait from a bottle containing the liquid bait. The stem is cut-off and the remaining portion serves as the bait station. The bait station is then placed in a horizontal position at the desired locations for permitting the ingress and egress of the ants intended to being exterminated. The bait station is thrown away once it has served its purpose.

4 Claims, 1 Drawing Sheet

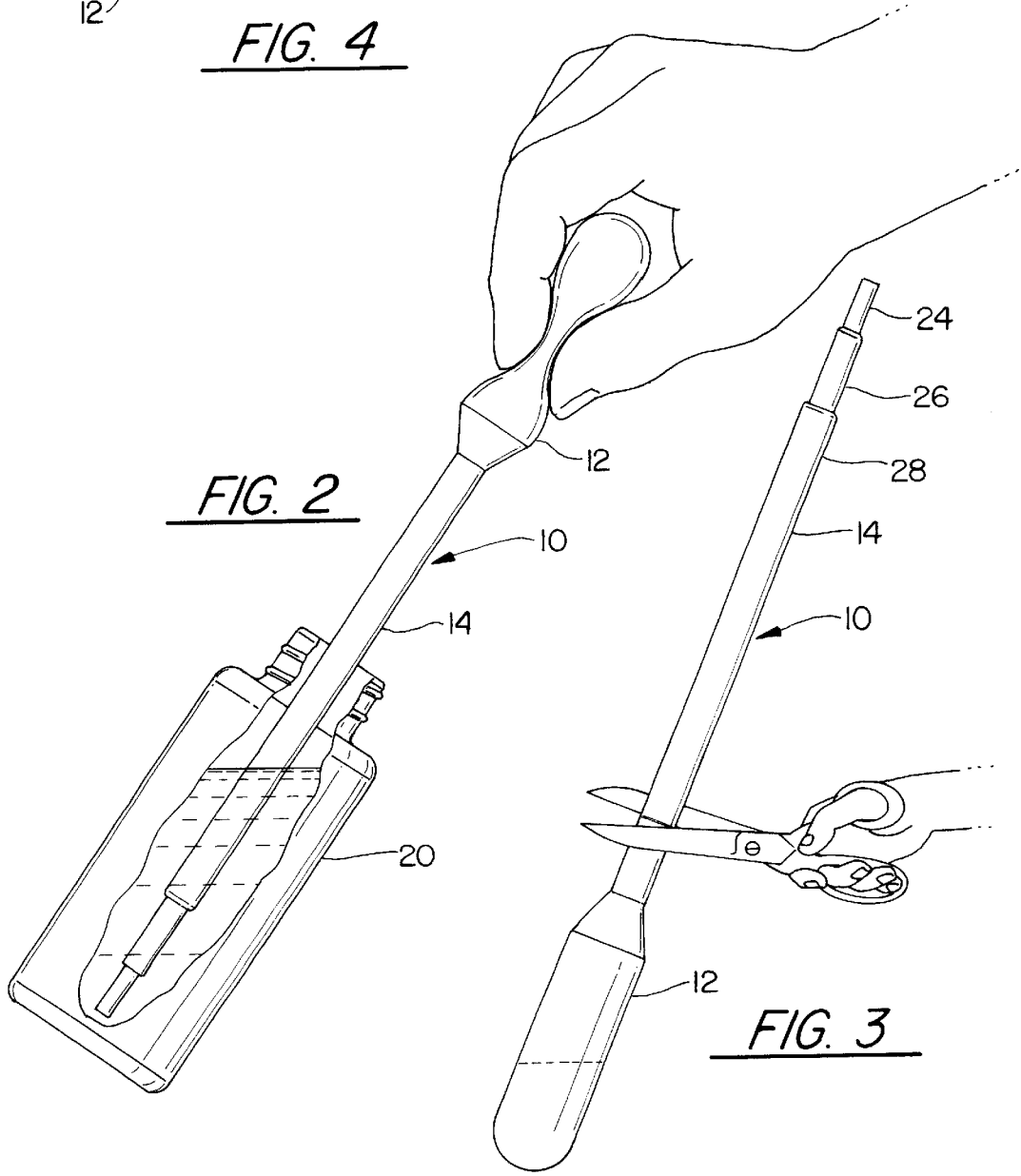

LIQUID BAIT STATION

TECHNICAL FIELD

This invention relates to bait stations to preclude or control the infestation of ants and more particularly to a bait station that is designed to be single piece structure capable of syphoning the liquid bait from a bottle or receptacle and the single piece structure then serves as the bait station.

BACKGROUND OF THE INVENTION

As one skilled in this art appreciates there have been a sundry attempts to preclude, reduce, control, etc. the infestation of ants, particularly, the well known Pharaoh or Sugar ants (Monomorium pharaonis (L). One such device is disclosed in U.S. Pat. No. 5,152,096 granted to Rudolph on Oct. 6, 1992 entitled "Bait Station". This patent discloses a bottle or receptacle that is pre-filled with a specific bait formulation and the opening in the bottle is arranged so that the ant must come into contact with the IGB bait prior to coming into contact with the insecticide. Hence, the receptacle is pre-filled with the IGB and insecticide formulae and the receptacle may be closed at one both ends and cut open upon use.

Another common method for control of these ants is to obtain a bottle of a liquid insecticide and pouring, usually a drop or so, in the area where there is a likelihood that the population migrates. Often, the drop is placed on the top of counters in the home, restaurant, etc. These insecticides are commercially available. Some of the problems occasioned with the use of this type of insecticide is that it is difficult to pour the desired amount in a given location, for example, a corner of the wall where the counter top meets, the liquid insecticide becomes hard over time and is difficult to remove and the like.

U. S. Pat. No. 5,875,586 granted on Mar. 2, 1999 to Ballard et al entitled "liquid Bait Station" discloses a structure formed in a rectangular configuration including a series or plurality of inner walls which minimizes the leakage of the liquid bait in the event it becomes disoriented. This bait station is refillable. As will be appreciated from the description to follow, in comparison to the present invention, this bait station is complex and would be more expensive to make than what is disclosed in the present invention.

This invention is concerned with liquid insecticides and of the type that one can obtain commercially and that is stored in a bottle or receptacle. I have found that a syphon type of bait station made from one piece that is capable of sucking up the liquid insecticide from the bottle and the tip or stem of the bottle being cut off or removed obviates the problems noted in the immediate above paragraphs. Typically the bait station syphon combination includes a bulbous end and a stem with a graduated opening with the narrow portion at the end. After the insecticide is syphon out of the bottle, the liquid is suck into the bulbous section, the stem is removed and the bulbous section now serves as the bait station. It is apparent that the bait station is easy to handle without soiling or contaminating the hands, person and/or clothes of the user and after it has served its purpose for its intended use, it can be easily removed and thrown away.

SUMMARY OF THE INVENTION

An object of this invention is to provide an improved bait station that is characterized as simple to use, free from contamination and inexpensive.

A feature of this invention is that the bait station is made from one piece formed in a syphon with a bulbous end and a stem end with an opening in the stem communicating with the interior of the bulbous end. The liquid insecticide is syphoned into the bulbous end and the stem is cut-off so that the bulbous end serves as the bait station.

The foregoing and other features of the present invention will become more apparent from the following description and accompanying drawings.

BRIEF DESCRIPTION OF THE DRAWINGS

FIG. 1 is a perspective view illustrating the inventive combined syphon and bait station; z FIG. 2 is a perspective view of the combined bait station and syphon illustrating the operation of the invention;

FIG. 3 is a perspective view of the invention with the stem portion being cut so as to configure the bait station; and FIG. 4 is a sectional view illustrating the configured bait station.

These figures merely serve to further clarify and illustrate the present invention and are not intended to limit the scope thereof

DETAILED DESCRIPTION OF THE INVENTION

The invention is best illustrated by referring to FIGS. 1–4 showing the bait station generally illustrated by reference numeral 10 comprising a bulbous end 12 and stem portion 14 defining a syphon. A central passage 16 is formed in the stem portion and extends from the tip 18 to the bulbous portion 14. The material selected for this one piece bait station structure is preferably a light weight resilient plastic or synthetic material such as polyvinyl chloride(PVC) polyethylene or polyethylene terephthalate. The thickness of the wall of the bait station 10, although not critical, should be sufficient to allow for the bulbous end to be easily flexed so that when squeezed as shown in FIG. 2, the liquid in the bottle 20 will be syphoned into the bulbous portion. The stem, is cut-off at almost any location, preferably adjacent the throat 22 of the bulbous portion or in close proximity thereto. Although the embodiment shows a commercially available scissors for cutting off the stem, obviously, any instrument can be used for this purpose. It is apparent from the foregoing that once the bulbous end 12 is filled or partially filled with liquid bait, the stem is removed or cut-off as shown in FIG. 3 and the bait station can then be located at any location, such as a counter top, floor or the like, where there is infestation of ants or a likelihood of infestation. The bait station is laid on its side or horizontal position so that the opened end lies horizontally relative to the ground. The ants will have a propensity to enter the opened end, remove some insecticide or liquid bait and return it to its nest where it works to kill off the ant colony. Obviously, the bulbous end portion should not be tipped upside down where the liquid could leak out of its opening.

The material selected for the bait station 10 should be impervious to liquid so that the liquid bait will not migrate through the pores of the material and moisture should not be able to enter the interior of the bulbous end to impair the effectiveness of the liquid bait, although moisture can migrate interiorly through the cut-off end.

Once the bait station 10 has served its purpose and the liquid starts to harden, the entire unit can be thrown away. Obvious, the handling of the bait station is simple for the user and should not present any problems with respect to soiling or contaminating other matter. The syphoning process likewise is a simple procedure and again eliminates or lessens the possibility of soiling or contamination.

While the stem portion can be made in a tapered or partially tapered continuous exterior configuration, the preferred embodiment is that shown in FIGS. 1, 2 and 3 where the end of the stem is stepped in three steps 24, 26 and 28.

What has been shown by this invention, is a disposable, simple, inexpensive bait station that doesn't have the propensity of soiling or contaminating the user. Tests conducted on the counter-top in a residence has shown that this bait station is efficacious, easy to use, and has exterminated colonies of ants.

Although this invention has been shown and described with respect to detailed embodiments thereof, it will be appreciated and understood by those skilled in the art that various changes in form and detail thereof may be made without departing from the spirit and scope of the claimed invention.

I claim:

1. A method of dispensing a liquid pesticide without having to dispense the liquid pesticide outside of a container comprising the steps of:
    i) providing a disposable bait station configured as a container made from a single piece of material having a bulbous closed end portion and an opened end hollow stem portion communicating with the bulbous closed end portion;
    ii) providing a source of liquid pesticide having ingredients for killing pests;
    iii) syphoning the liquid pesticide from the source into the container by the bulbous end portion; and
    iv) cutting the stem portion so as to leave an opening leading into the bulbous portion of the container for defining a bait station; and
    v) placing the bait station in locations for attracting the pests and where it is intended to exterminate the pests.

2. The method as claimed in claim 1 wherein said material is a synthetic plastic taken from the group consisting of polyvinyl chloride, polyethylene or terephthalate.

3. The method as claimed in claim 2 wherein the opened end hollow stem portion is formed into graduated steps with the larger diameter steps being progressively located toward the bulbous portion.

4. The method as claimed in claim 2 wherein the container includes a throat formed adjacent to the bulbous closed end portion and at the juncture of the bulbous closed end portion and the opened end hollow stem portion and that in the step of cutting, the stem is cut-off at the throat leaving the bulbous closed end portion as the bait station.

* * * * *